United States Patent

Lehnert

[11] 3,902,850
[45] Sept. 2, 1975

[54] SOLVENT-FREE, SELF-CLEANING MIXING HEAD NOZZLES FOR REACTIVE POLYMER MIXES

[75] Inventor: Andrew B. Lehnert, Copley, Ohio

[73] Assignee: The Upjohn Company, Kalamazoo, Mich.

[22] Filed: Mar. 18, 1974

[21] Appl. No.: 451,796

[52] U.S. Cl. .................. 23/252 R; 23/285; 259/7; 259/8; 259/23; 260/2.5 BC
[51] Int. Cl.² ........................................ B29D 27/02
[58] Field of Search .......... 23/285, 252 R; 259/7, 8, 259/23

[56] References Cited
UNITED STATES PATENTS

| | | | |
|---|---|---|---|
| 2,857,144 | 10/1958 | Gurley, Jr. et al. | 259/8 X |
| 2,958,516 | 11/1960 | Wall et al. | 23/252 R X |
| 2,969,960 | 1/1961 | Gurley, Jr. | 259/7 |
| 3,111,389 | 11/1963 | Hanson et al. | 23/252 R |

Primary Examiner—James H. Tayman, Jr.
Attorney, Agent, or Firm—Steward & Steward

[57] ABSTRACT

A dispensing nozzle is disclosed for use on a mixing head of the type employed in blending and dispensing polymerizable liquid components, especially in the manufacture of foamed plastic products. The nozzle is continuously self-cleaning without need for solvent flushing, making possible long periods of operation free of down-time for removal of accummulated, adherent polymerized material within the nozzle. The characterizing features of the nozzle are a frustoconical walled housing within which a spiro-helical finned rotor is spun to properly blend the separate liquid components prior to discharging the resulting mix into molds. The housing and rotor are configured to produce the necessary homogenization of the liquid components with minimum adverse effect on the physical cell configuration of the resulting polymerized foam, as well as minimizing internal build-up of polymerized material.

7 Claims, 5 Drawing Figures

SOLVENT-FREE, SELF-CLEANING MIXING HEAD NOZZLES FOR REACTIVE POLYMER MIXES

BACKGROUND OF THE INVENTION

This invention relates to nozzles for mixing fluid components which react when brought into contact with each other and quickly develop into a highly viscous and eventually into a fully set, polymerized mass. It is especially directed to apparatus for preparing and dispensing polyurethane foam mixes for casting or molding of shaped foam products.

One of the problems encountered in combining various liquid components of the type used in preparing polymerizable resin mixes is that of adequately blending the separate components into a homogeneous fluid mass in such manner that the isotropicity of the cell structure of the ultimate product is not adversely affected, and then dispensing the mix in a manner to avoid substantial gelation and attendant build-up of adherent solid material within "dead spaces in the mixing head and nozzle of the apparatus. Many mixing and dispensing nozzles designed to handle such products have been proposed. In general these employ some form of chamber into which the separate reactive components are introduced, where they are mixed or agitated and finally dispensed into a mold or other receptacle within which the polymer mix is retained until a full polymerization or set has developed. The usual mixer design has conventially included a housing and a cooperating rotor or agitator, and provision is made for introducing the separate reactive components to be blended at some point in the housing. The separate fluid components as received are combined in a basket or receiver section from which they are advanced by impeller means on the rotor to a mixing section where more intensive agitation and homogenization of the composition is effected. The mix is finally moved to a discharge section of the housing and expelled from an exit orifice into a shaping mold or other forming device.

Prior apparatus designed for the purpose varies in character from relatively simple mixing or stirring arrangements to mechanically complicated homogenizer structures. Typical nozzle designs of relatively simple structure are illustrated in U.S. Pat. Nos. 2,857,144, 2,969,960, 3,067,987. Devices which are mechanically more complicated are seen in such prior patents as U.S. Pat. Nos. 3,102,004, 3,362,919, 3,420,506, 3,608,870 and 3,774,887. The emphasis in all such mixing nozzles has been toward achieving homogeneity of the resulting mix, since this has a very pronounced effect upon the physical properties of the resulting polymerized product. This is particularly so in the case of polymer foam mixes.

Difficulty is encountered in such apparatus due to gradual accummulation and agglomeration of polymerized product within interstices or "dead" areas of the mixing head, especially if the mixing and dispensing operations must be interrupted or intermittent as is often desirable when working into a multiple-station mold. Unless the mixing nozzle is carefully cleaned or purged frequently during operation, the nozzle soon becomes clogged and the operation cannot be continued until this has been cleared. One method employed in trying to alleviate this condition has been to purge the interior of the mixing nozzle with a suitable organic solvent by forcing the solvent through the nozzle under high pressure at frequent intervals such as after each dispensing operation. Not only is this expensive in terms of solvent but often there is insufficient time to do this between dispensing operations where a multiple-station mold is used. Equally as important, care must be taken to see that no solvent remains in the mixing nozzle at the conclusion of the purge which could alter the composition of polymer mix subsequently introduced.

SUMMARY OF THE INVENTION

It is a principal objective of the present invention to provide a mixing nozzle for the purpose described which is continuously self-cleaning under conditions of intermittent operation without need for solvent flushing. To this end, the design of the nozzle here disclosed minimizes the presence of any static or "dead" areas in the interior of the nozzle which would provide sites for reacted polymer build-up to occur. A further important objective of the nozzle design is that of producing improved homogenization of the component mix, yet avoiding such harsh physical agitation of it which tends to introduce residual "strains" which only manifest themselves later as irregular, nonuniform cell structure in the finished product.

The novel mixing nozzle design incorporates a housing having a generally frustoconical inner wall within which a complementary frustoconical rotor is supported for rotation. The nozzle housing is removably secured to a face of a mixing head to which the several fluid components are ducted for delivery to ports in the face of the head which open into communication with the larger, component-receiving end of the nozzle housing. The rotor in turn is configured to provide a peripheral surface which so conforms with the interior of the housing and face of the mixing head in the area of the aforesaid ports as to effect a continuous wiping contact between the rotor and housing throughout the mixing area. Distributor vanes on the larger end of the rotor make close wiping contact with the ported face of the mixing head, as well as acting as barriers for reducing by-pass flow from one component feed port to another across the end face of the rotor. These vanes help to channel the liquid components radially to the frustoconical surface of the nozzle housing. Coacting with that surface are helical fin means formed on the rotor, the crests of which make light bearing contact with the side wall of the housing. The nozzle wall and finned rotor together thus define a spiro-helical chamber of uniform, generally rectangular cross section extending along the rotor-housing interface to an outlet at the smaller end of the housing. The rotor is driven by a suitable shaft and motor, and the peripheral fin configuration is pitched to assist travel of the polymer mix through the housing. Proper homogenization of the polymer components is enhanced by a special fin configuration wherein the projecting fin means is interrupted by intersection of one or more grooves of different pitch but also of spiro-helical configuration. Such grooves produce interrupted fin segments forming passages between them for limited recirculation of polymer mix from one adjacent helical chamber area to the next. A removable end cap is provided at the smaller, mix-delivery end of the housing with a suitable discharge orifice through which the admixed product is dispensed from the nozzle.

The features of the invention are here illustrated with reference to a specific embodiment of the concept shown in the accompanying drawings and described in greater detail hereinafter. Such drawings and description represent a presently preferred construction, but changes coming within the scope of the appended claims will be obvious and are accordingly within the inventive concept.

In the drawings,

FIG. 5 is a flat projection of development of the surface of the rotor.

Figure 1:
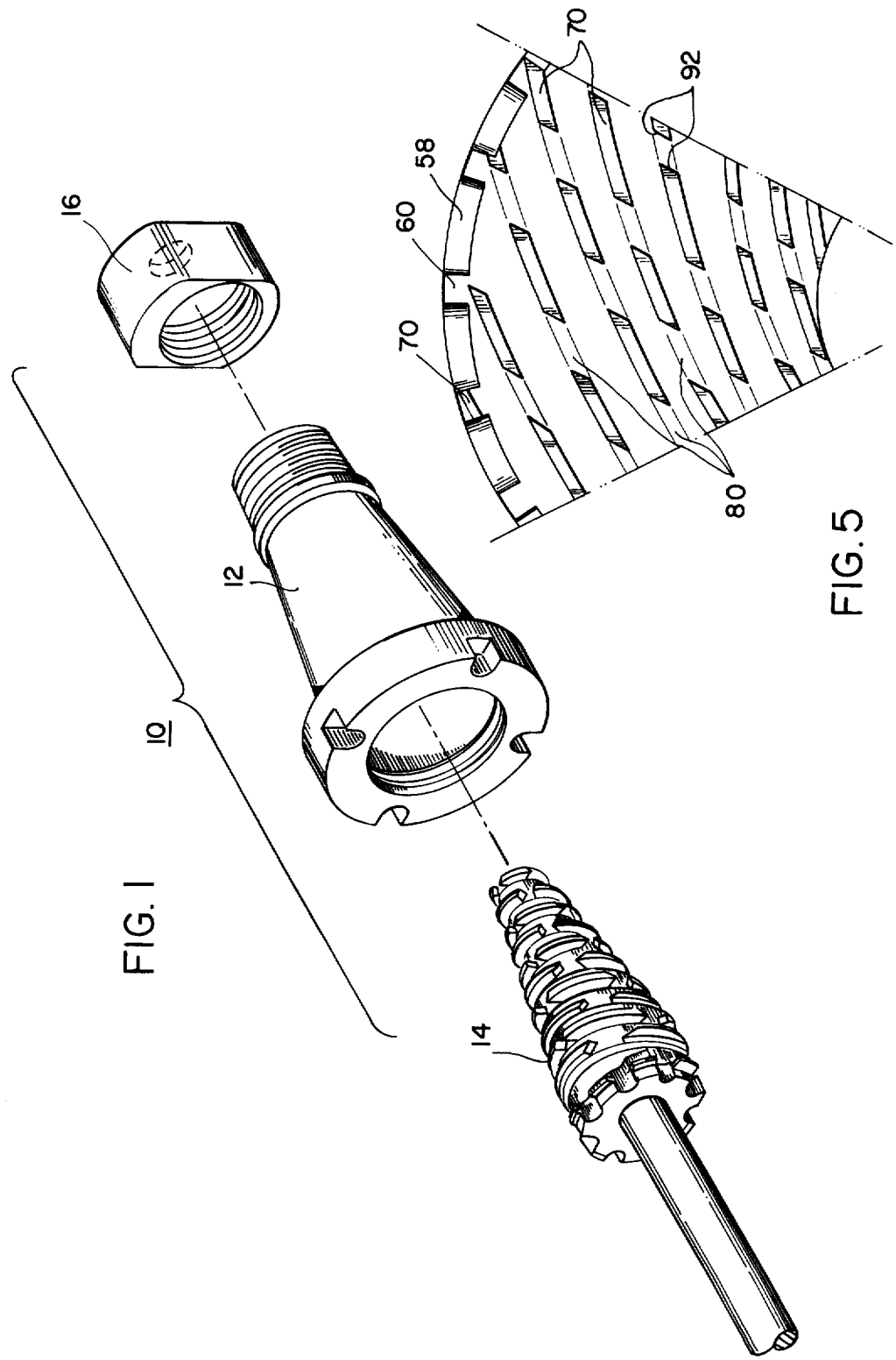
FIG. 1 is an exploded view in perspective of the mixing nozzle without cooling jacket.
Figure 2:
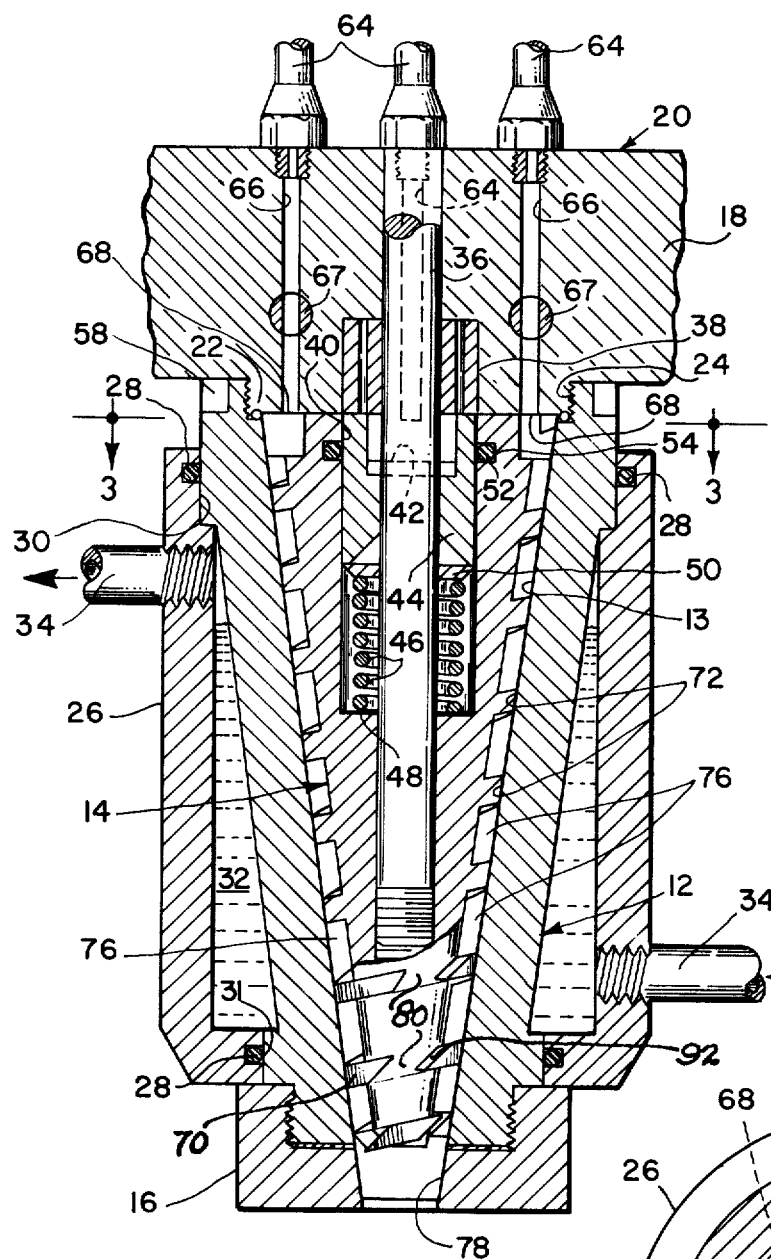
FIG. 2 is a cross sectional view in side elevation of the mixing nozzle and an encasing cooling jacket, parts being broken away for purposes of clarity of illustration.
Figure 4:
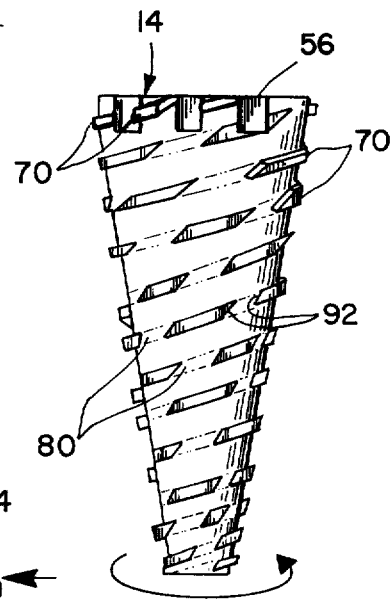
FIG. 4 is a side elevational view of the rotor.

Mixing nozzle 10, as seen in FIG. 1 with its component parts in exploded relation, consists of a housing 12, a rotor 14 and threaded end cap 16. When assembled in operating condition as seen in FIG. 2, nozzle 10 is detachably mounted on the bottom face of body 18 of mixing head 20 of a type commonly used in polyurethane or similar polymer foam producing equipment. As installed on mixing head 20, nozzle 10 is removably retained on a threaded boss 22 on the lower face of the body, the boss being received in threaded socket 24 of the housing. The body of the housing is encased in a cooling jacket 26 retained in position by end cap 16 threaded to the lower end of the housing. Gaskets 28 form water-tight seals between jacket 26 and the exterior of housing 12 at shoulders 30, 31, to define a coolant chamber 32 serviced by ducts 34.

Housing 12 is open-ended and its interior surface 13 is of smooth frustoconical form. Rotor 14 is of complementary frustoconical form. A shaft 36 journalled at 38 in head 20 extends into threaded engagement at the bottom of a shouldered socket 40 in rotor 14, and a motor (not shown) is connected to the shaft to drive the rotor. Shaft 36 is drilled diametrically to receive a retaining pin 42 located in the upper end of the enlarged portion of socket 40. An annular bearing seal 44, recessed to receive and retain pin 42, surrounds the shaft and makes a sliding seal in the stepped upper wall of socket 40. Seal 44 is pressed axially upward by coil spring 46 surrounding the shaft. The spring rests at its lower end on step 48 of socket 40 and engages a washer 50 interposed between the spring and seal 44. The latter is thus pressed against the underface of boss 22 of the mixing head to seal shaft 36 and shaft bearing 38 from the interior of housing 12. An O-ring 52 in annular groove 54 formed in the interior of socket 40 at its upper end is also used to engage the periphery of the seal within the socket.

Figure 3:
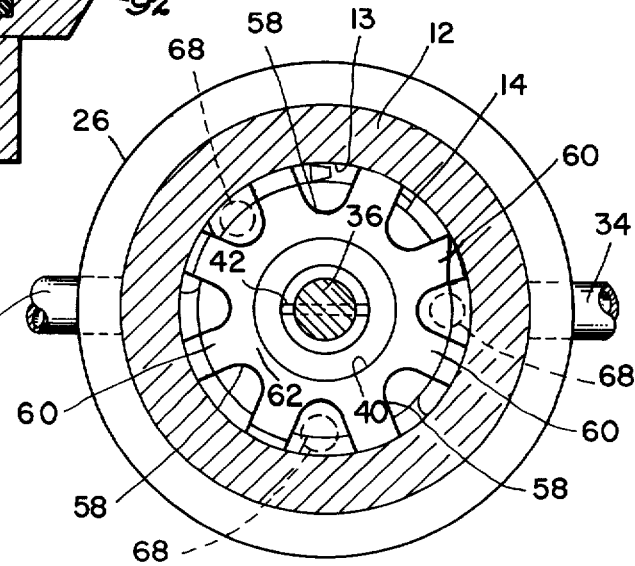
FIG. 3 is a cross sectional view taken on line 3—3 on FIG. 2.

As seen in the drawings, stepped socket 40 is bored axially into the rotor from the larger, component-receiving base 56 which abuts the end face of boss 22. In the periphery surrounding this bore, rotor 14 is formed with a series of radially oriented pockets or recesses 58 milled into the end face to define distributor vanes 60, as seen more particularly in FIG. 3. Vanes 60 are relatively shallow in axial depth and radiate outwardly from a circular land or hub portion 62 of the rotor. The upper faces of vanes 60 abut the face of boss 22 and effectively wipe it as the rotor turns.

Liquid components for the polymer mix are introduced by conduits 64 to separate passages 66 in mixing head 20, and valve means 67 in the passages control the admission of each component at ports 68 in the end face of boss 22. Thus the liquid components are delivered into communication with recesses 58 of the rotor as it turns.

The outer surface of rotor 14 is formed with helical threads or fins 70 extending about the rotor throughout its axial extent. In addition to their helix configuration, fins 70 also have a spiral dimension owing to the slope of the frustoconical surface of the rotor. The fins are of generally rectangular cross section, and their flat crests make sliding contact with the inner surface 13 of housing 12, thus defining a spiro-helical passage 76 of rectangular section between the rotor and housing which serves as an elongated mixing chamber for the components. With rotation of rotor 14, fins 70 help to move the fluid components through the chamber 76 to exit orifice 78 in end cap 16.

Fins 70 are interrupted along their helical path by a series of grooves 80 also helically cut into the surface of the rotor but of steeper pitch than fins 70. These grooves also are of spiro-helical configuration, accordingly, and are pitched in same direction of helix as fins 70. The principal purpose of these is to permit transition of polymer mix between adjacent passages 76 at intermediate points on the periphery of the rotor prior to discharge of the mix through orifice 78.

As already mentioned, the upper end of rotor 14 is substantially coplanar with the adjacent end wall of boss 22. In practice a typically desired order of clearance is about 0.025 inch. The arrangement is such that not only is there an efficient wiping action produced by vanes 60 surrounding ports 68, but there is also substantial impedence to by-pass flow between the ports. Intermixing of the components at the ports themselves is thus minimized, and less opportunity for build-up of polymerized material at or in the ports is ensured.

A close working tolerance is also maintained between the flat crests of fins 70 and the adjacent nozzle wall 13, in practice this being typically from 0.002 to 0.010 inch. The mix-delivery end of the nozzle is always open, by reason of orifice 78, and a smooth transition is made between wall 13 and orifice 78 so that minimum opportunity for retention of polymerized material at this point is presented. Even if significant build-up of polymerized material should occur in the orifice in wall areas not contacted by the rotor, clean-out can be effected with only a momentary interruption in the operation by simply unscrewing end cap 16 and substituting a clean one. Although not so shown, rotor 14 may be extended axially into orifice 78 to terminate with the exterior face of the cap, but the illustrated recessing of the end of the rotor is preferred to induce sufficient choking effect on the exiting stream of mix to minimize a tendancy for it to swing out in an arc, making accurate delivery into a receiving mold difficult.

Experience has shown that correlation between the width of passages 76 and the width or thickness of fins 70 is important. In general it appears that the width of the fin crest should be about 1/3 to 1/5 the spacing between adjacent fins to produce the desired retention of polymer mix within the nozzle for proper homogenization.

A further important aspect of the rotor configuration results from the intersection of grooves 80 with fins 70, in that a series of unidirectional oblique faces or shear planes 92 are formed at each end of each interrupted fin segment, one facing up and the other down. The fin geometry causing a single, unidirectional face terminating in a sharp chisel edge of the fin segment appears to effect better homogenization of the mix components without excess agitation or inducing other physical restraints which adversely affect the chemical reaction of the components and the isotropicity of the foam cell structure resulting therefrom. It will be noted that with uniform width of grooves 80, the length of the interrupted fin segments decreases towards the outlet end of the nozzle, as a consequence of the fact that the rotor diameter decreases in that same direction.

In constructing the rotor, which may be of metal or molded plastic, a frustoconical blank is properly chucked in a power head of a milling machine and the spiro-helical threads 70 are formed by an end miller while the rotor blank is slowly turned. Similarly, grooves 80 are formed by an end miller after rechucking the rotor to position it for the different helical inclination. In the preferred embodiment, a multiple lead fin is employed, such as the three-lead configuration shown in the drawings, in which each thread begins 120° from the next about the rotor axis. In this design six grooves 80 are employed, equally spaced about the rotor axis.

Specific dimensional relations in respect to the fin and groove configuration of the rotor will of course be dependent upon rotor speed, chemical composition of the mix and its viscosity, temperature and through-put or delivery rate of product. For a through-put capacity of about 12 pounds per minute of a typical polyurethane mix, having a viscosity of around 1200 centipoises, a suitable rotor will be about 3¼ inches in length, with a larger diameter of about 1½ inches and a smaller diameter of about ⅝ inch. In this case the pitch angle of fins 70 should be about 60° to the rotor axis, while the pitch angle of grooves 80 should be about 45° to that same axis. The width of grooves 80 is 5/16 inch.

Nozzles of the type disclosed are of particular utility where a manufacturing operation calls for short periods of polymer discharge, as where a few ounces of polymer is accurately measured amount is discharged periodically into a series of continuously advancing molds. In such cases it is not practical to slow down the molding operation to permit solvent flushing in the interval between the arrival of molds at the dispensing station. Generally only a very short interval of time, of the order of a few seconds, is all that is available. Any attempt to flush in such a short interval runs into the problem of causing mix ratio changes due to trace residual solvent in the nozzle. This of course is deleterious to the physical properties of the finished product. On the other hand, continuous, uninterrupted dispensing of the mix is also impractical because of waste during the departure of a first mold and arrival of a subsequent mold to the dispensing site. Prior experience with available nozzles under the foregoing conditions has required a complete shut down of the mixing head and disassembly and manual cleaning of the nozzle housing and rotor, on an average of every two or three hours at best. Using nozzle arrangements of the design here disclosed, operation on a continuous basis has been achieved, except for replacement of the end cap no oftener than once a day, and this can be done in a matter of seconds without interruption of the mixing head operation.

What is claimed is:

1. In a mixer apparatus for homogeneously combining a plurality of reactive fluid components to produce a rapidly polymerizable viscous mix, and including a mixing head having an end face, a drive shaft projecting therefrom and component delivering ports opening onto said face circumferentially about said drive shaft, the improvement in nozzle means for said mixing head which is continuously self-cleaning without reliance on solvent flushing, said improved nozzle comprising a housing having a frustoconical inner wall extending from a component-receiving end to a mix-delivery end, with the larger base of the frustum located at the component-receiving end;

means for mounting said nozzle housing with its component-receiving end against the face of the mixing head and in enclosing relation to the drive shaft and fluid component ports thereat, whereby to form a closure for the component-receiving end of said nozzle;

closure means removably attached to the mix-delivery end of said nozzle and having provision therein to allow emission of homogenized polymer mix;

a homogenizing rotor disposed coaxially within said housing and having a peripheral configuration complementary to the inner wall thereof, means including the drive shaft in the mixing head for supporting said rotor coaxially of said nozzle housing for rotation therein whereby the peripheral surfaces of said rotor effectively wipe the respective complementary surfaces of said housing, said rotor having a. an end face at its component-receiving end which is complementary to the face of the mixing head against which said housing is mounted, said rotor end-face being formed with a plurality of radially inwardly directed recesses to provide distributor vanes at its periphery, said vanes radially intersecting the locations of and effectively wiping the component feed ports in the face of the mixing head enclosed by the nozzle housing, b. fin means forming a spiro-helix along the frustoconical surface of said rotor, with the outer extremities of said fin means effectively wiping the complementary housing surface, c. groove means extending in spiro-helical manner along said rotor surface and intersecting said fin means to form interrupted fin segments, wherein said fin and groove helix pitch angles are in the same relative direction but said groove means has a higher helical pitch angle than the pitch angle of said fins; and axially oriented socket means opening onto the component-receiving end of said rotor, said socket means including provision for making connection to the drive shaft of the mixer head.

2. A mixing nozzle as defined in claim 1, wherein said fin means has a substantially flat crest.

3. A mixing nozzle as defined in claim 1, wherein said rotor fin means is of multiple lead screw design, and said groove means comprises a plurality of grooves equally spaced about the periphery of said rotor.

4. A mixing nozzle as defined in claim 3, wherein said rotor fin means is of triple lead screw design and said groove means consists of six grooves.

5. A mixing nozzle as defined in claim 4, wherein the ratio of fin width to fin spacing along said rotor is from 1 to 3 to 1 to 5.

6. A mixing nozzle as defined in claim 1, which further includes a cooling jacket surrounding said housing and making a seal therewith at the opposite bases to define a coolant chamber between said bases, ports in said jacket for coolant delivery and discharge, said jacket being retained on said housing by said end closure means at the mix-delivery end.

7. A mixing nozzle as defined in claim 1, wherein said rotor is formed with a stepped axial socket opening onto its larger end, and includes a bearing seal axially received in said socket, with spring means urging said bearing outwardly thereof.

* * * * *